Figure 1:
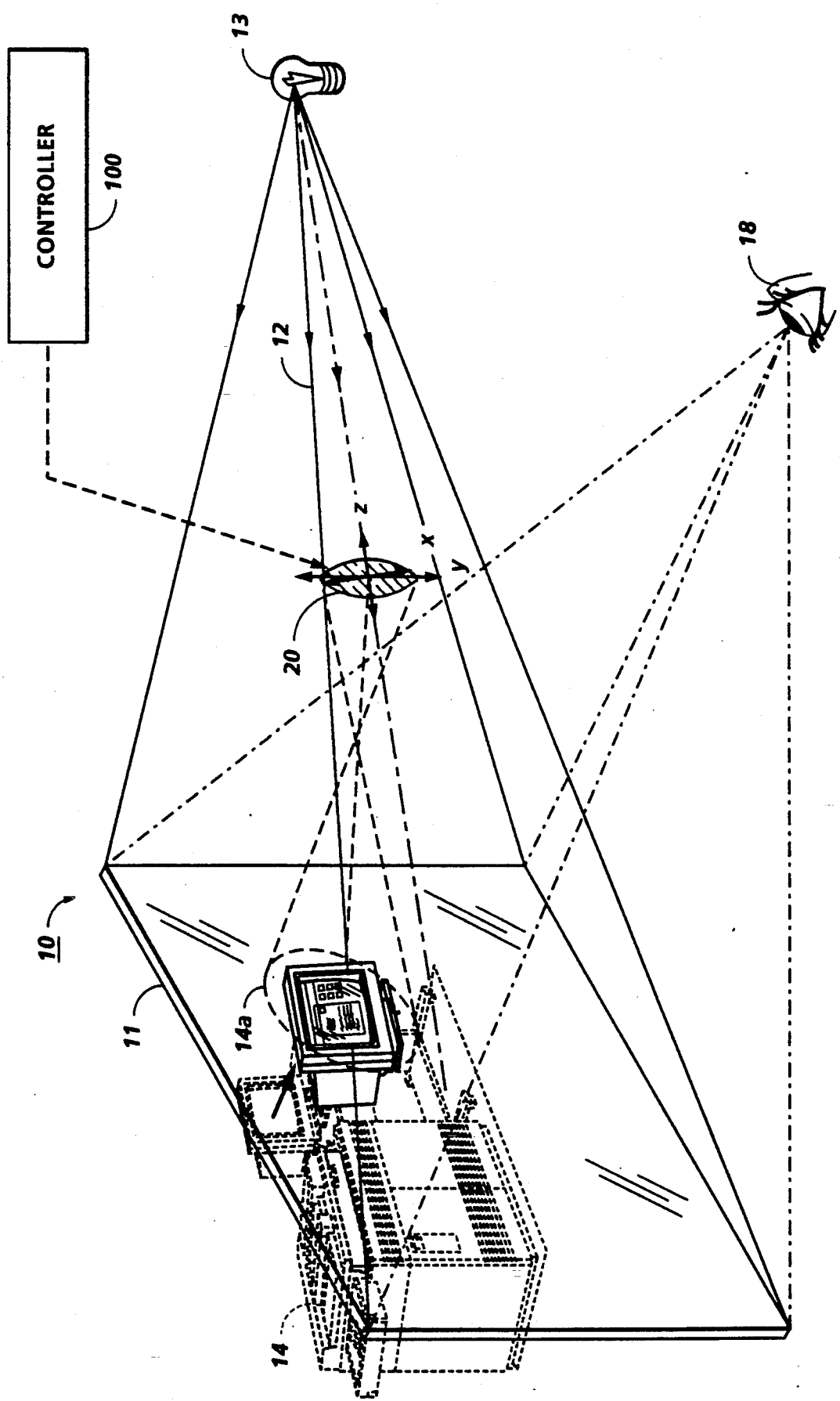

United States Patent
Poleshuk

Patent Number: 5,109,289
Date of Patent: Apr. 28, 1992

[54] HOLOGRAPHIC DISPLAY WITH PROGRAMMABLE AREA HIGHLIGHTING

[75] Inventor: Michael Poleshuk, Webster, N.Y.

[73] Assignee: Xerox Corporation, Stamford, Conn.

[21] Appl. No.: 617,843

[22] Filed: Nov. 23, 1990

[51] Int. Cl.$^5$ ............................................. G03H 1/22
[52] U.S. Cl. .......................................... 359/32; 359/1; 359/900
[58] Field of Search ...................... 350/3.6, 3.67, 3.7, 350/3.74, 3.84, 3.85, 3.86, 3.75, 3.78, 3.77, 3.83; 359/900, 1, 10, 15, 21, 31, 32, 33, 30, 22, 24, 25

[56] References Cited

U.S. PATENT DOCUMENTS

| | | | |
|---|---|---|---|
| 3,670,426 | 6/1972 | Horowitz | 35/12 N |
| 3,706,080 | 12/1972 | Lee | 340/174 |
| 4,623,215 | 11/1986 | Bazargan | 350/3.85 |
| 4,790,613 | 12/1988 | Moss | 350/3.85 X |
| 4,896,929 | 1/1990 | Haas et al. | 350/3.85 |
| 4,902,082 | 2/1990 | Okabayashi et al. | 350/3.86 X |
| 4,954,913 | 9/1990 | Kajita | 358/474 |

FOREIGN PATENT DOCUMENTS 0243949  11/1987  European Pat. Off. ............ 350/3.85

Primary Examiner—Bruce Y. Arnold
Assistant Examiner—David R. Parsons

[57] ABSTRACT

Highlighting a selected area of a holographic display indirectly by selectively repositioning a small lens within the hologram illumination beam.

1 Claim, 1 Drawing Sheet

HOLOGRAPHIC DISPLAY WITH PROGRAMMABLE AREA HIGHLIGHTING

This is a system for automatically highlighting a selected image or area of a holographic display by selectively positioning a movable designating lens in a minor area of the hologram illumination input beam. No liquid crystal or LED interfacing is required and parallax problems are minimized.

Holographic displays are taught in Xerox Corp. Ser. No. 07/591/238 (allowed) filed Oct. 1990 by J. R. Andrews, et al., "Segmented Hologram for Multi-Image Display", and U.S. Pat. No. 4,896,929, and art therein. They are useful for instructive or interactive copier, printer or other machine control or diagnostic displays, and can be manufactured inexpensively as embossed plastic films. A pivoting lens for a hologram is in U.S. Pat. No. 3,706,080.

FIG. 1 schematically shows one example 10 of a subject display system.

In this system 10, a conventional hologram 11 is illuminated in a known manner by an off-axis input light beam 12 from white light source 13 to display a 3-D image 14 to the viewer's eye 18. A lens 20 is movable within input beam 12 to highlight (magnify and/or brighten) for the viewer any selected part (designated minor image area 14a) of the display with any suitable 2-axis (x-y) drive or positioning mechanism therefore, such as shown in U.S. Pat. No. 3,670,426 FIGS. 5–8 or U.S. Pat. No. 4,954,913 FIG. 1, controlled by conventional key or button selectable and/or programmable microprocessor controller 100. If "zoom" type magnification and/or area change of the highlighted graphic or text material is desired, a third (z) axis lens motion is also conventionally provided. The lens 20 is not in the image path or viewer field of view of the hologram 11. The lens 20 here is a double convex lens, significantly smaller in diameter than the input beam 12 or the hologram 11, but various other conventional negative, positive or cylindrical lenses or standard or tunable holographic lenses may be used.

Cited art is incorporated by reference.

What is claimed is:

1. A method of automatically highlighting by brightening and/or enlarging a selected area of a holographic image from a hologram illuminated by an input light beam comprising the steps of positioning a movable designating lens within said hologram illumination input light beam and selectively repositioning said lens to selected minor areas of said input light beam to highlight said selected areas of said holographic image.

* * * * *